(12) United States Patent
Jain

(10) Patent No.: US 11,561,870 B2
(45) Date of Patent: Jan. 24, 2023

(54) SSD WITH COMPRESSED SUPERBLOCK MAPPING TABLE

(71) Applicant: Kioxia Corporation, Minato (JP)

(72) Inventor: Amit Jain, Cupertino, CA (US)

(73) Assignee: Kioxia Corporation, Tokyo (JP)

( * ) Notice: Subject to any disclaimer, the term of this patent is extended or adjusted under 35 U.S.C. 154(b) by 393 days.

(21) Appl. No.: 16/834,350

(22) Filed: Mar. 30, 2020

(65) Prior Publication Data

US 2021/0303424 A1 Sep. 30, 2021

(51) Int. Cl.
*G06F 11/20* (2006.01)
*G06F 3/06* (2006.01)

(52) U.S. Cl.
CPC .......... *G06F 11/2094* (2013.01); *G06F 3/064* (2013.01); *G06F 3/068* (2013.01); *G06F 3/0619* (2013.01); *G06F 2201/82* (2013.01)

(58) Field of Classification Search
CPC .... G06F 11/2094; G06F 3/0619; G06F 3/064; G06F 3/068; G06F 2201/82; G06F 11/1417; G06F 2212/1032; G06F 2212/7201; G06F 2212/7205; G06F 2212/7208; G06F 12/0246; G06F 3/0679

USPC ....................................................... 714/6.13
See application file for complete search history.

(56) References Cited

U.S. PATENT DOCUMENTS

2019/0129841 A1\* 5/2019 Kanno ................. G06F 3/0614
2020/0034080 A1\* 1/2020 Chen ...................... G06F 3/064

\* cited by examiner

*Primary Examiner* — Yair Leibovich
(74) *Attorney, Agent, or Firm* — Allen & Overy LLP

(57) ABSTRACT

An improved solid state drive (SSD). The SSD comprising a plurality of non-volatile memory dies, each configured to store at least one block of data associated with one of a plurality of superblocks each containing a plurality of blocks; a volatile memory; and a memory controller. The memory controller configured to store a bit map associated with a first superblock of the plurality of superblocks in the volatile memory, wherein the bit map is configured to indicate whether each of the plurality of blocks is a replacement block, store a block address list in the volatile memory, the block address list is configured to store an address of one or more replacement blocks, and store a replacement block index in the volatile memory associated with the first superblock of the plurality of superblocks, the replacement block index corresponding to the location of an address of a first replacement block of the first superblock in the block address list.

20 Claims, 6 Drawing Sheets

Fig. 2

| 306₂ | 305 | 306₁ | ... | 305 | 306₃ | 305 |
|---|---|---|---|---|---|---|
| 305 | 306₄ | 305 | ... | 305 | | 305 |
| 305 | 305 | 305 | ... | 305 | 305 | 305 |

Fig. 3B

| 316 | ... | 315 | 314 | 313 | 312 | 311 |
|---|---|---|---|---|---|---|

Fig. 3C

| Block Bit Map 301 |
|---|
| Replacement Block List Index 303 |

Fig. 3A

| Drive size | Uncompressed Legacy Table | Compressed Table |
|---|---|---|
| 1 TB | 0.25 MB | 30 KB |
| 16 TB | 4 MB | 480 KB |
| 32 TB | 8 MB | 960 KB |

Fig. 6

SSD WITH COMPRESSED SUPERBLOCK MAPPING TABLE

FIELD OF INVENTION

This invention generally relates to Solid State Drives (SSDs) implementing reduced sized logical to physical mapping information.

BACKGROUND OF THE INVENTION

SSDs are surpassing traditional spinning disk hard drives due to the performance benefits of SSDs. However, traditionally, SSDs have been substantially more expensive than spinning disk hard drives. Further, as with most memory, the larger the capacity of the SSD, the higher the cost of the SSD. As result, only recently have large SSDs (SSDs with capacities in the terabytes) begun entering the market.

These large capacity SSDs have begun introducing a number of disadvantages that counteract some of traditional advantages associated with SSDs. One set of disadvantages stems from the fact that as the capacity of SSDs increases so does the amount of data required to store the logical to physical mapping information for the SSD. As a result, many large capacity SSDs can no longer store the mapping information in internal SRAM. Rather, large capacity SSDs turn to external DRAM. External DRAM is slower, thereby introducing increased latency. Further, external DRAM introduces an additional cost factor in the production of large capacity SSDs. In addition, external DRAM also consumes more power than internal SRAM.

Moreover, larger amounts of physical to logical mapping information increases the amount of data that must be transferred to non-volatile memory during a power loss event. This not only increases the risk that not all of the data will be transferred during a power loss event, but also increases the requirements and costs of power loss protection components, such as the power loss protection capacitor, which further increases the cost of large capacity SSDs.

Accordingly, there is a long felt need for large capacity SSDs that reduce the amount of data required to translate logical to physical addresses.

BRIEF DESCRIPTION

Certain aspects of the present invention are directed to an improved SSD. The SSD comprising a plurality of non-volatile memory dies, each configured to store at least one block of data associated with one of a plurality of superblocks each containing a plurality of blocks; a volatile memory; and a memory controller. Further, the memory controller configured to store a bit map associated with a first superblock of the plurality of superblocks in the volatile memory, wherein the bit map is configured to indicate whether each of the plurality of blocks is a replacement block, store a block address list in the volatile memory, the block address list is configured to store an address of one or more replacement blocks, and store a replacement block index in the volatile memory associated with the first superblock of the plurality of superblocks, the replacement block index corresponding to the location of an address of a first replacement block of the first superblock in the block address list.

According to certain embodiments of the present invention, the memory controller is further configured to determine if a block of the plurality of blocks in the first superblock is a defective block.

According to other embodiments of the present invention, the memory controller is further configured, upon determining that the block is a defective block, to set a bit of the bit map to indicate the block is a replacement block.

According to certain other embodiments of the present invention, the memory controller is also configured, at a first predetermined time period, to associate a block of a spare superblock with the first superblock; and store an address of the block of the spare superblock in the block address list. According to some embodiments of the present invention, the first time period is part of the initial boot-up sequence of the SSD.

According to yet other embodiments of the present invention, the memory controller is further configured to determine, using the bit map, a replacement block index offset for the given replacement block; and determine a physical address of the given replacement block using the index offset, the replacement block index, and the block address list.

According to yet other embodiments of the present invention, for a non-defective block of the first superblock, the controller is further configured to determine the physical address of the non-defective block using a fixed address algorithm based on a logical address of the non-defective block.

According to certain other embodiments of the present invention the volatile memory is static random access memory.

According to certain embodiments of the present invention, the fixed algorithm is based on plane and die information derived from the logic address of the non-defective block.

According to certain other embodiments of the present invention, the plurality of non-volatile memory dies are organized into a plurality of channels and the fixed algorithm is further based on the channel of the non-defective block.

DESCRIPTION OF THE FIGURES

FIG. 2 illustrates a number of superblocks and the spare superblock according to certain embodiments described herein.

FIG. 3A illustrates superblock mapping information in accordance with certain embodiments described herein.

FIG. 3B illustrates a sample block bit map in accordance with certain embodiments described herein.

FIG. 3C illustrates a portion of a block address list in accordance with certain embodiments described herein.

FIG. 6 illustrates a comparison of the amount of data need to store logical to physical block mapping information according to certain embodiments described herein.

DETAILED DESCRIPTION

Figure 1:
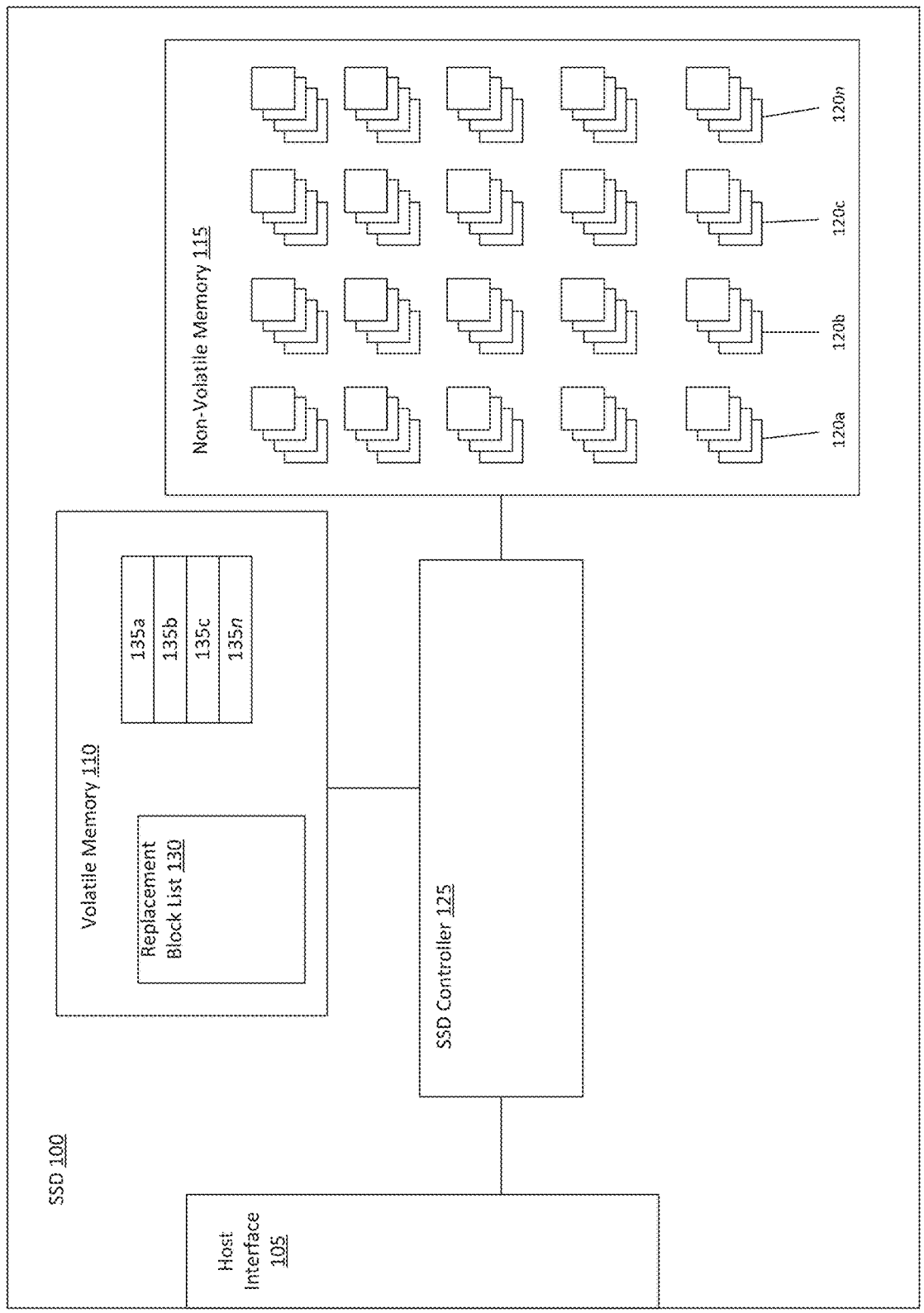
FIG. 1 illustrates a solid state drive (SSD) in accordance with certain embodiments described herein.

FIG. 1 illustrates an SSD 100 according to certain embodiments described herein. However, a person of ordinary skill in the art would understand that this is only a high level diagram of certain aspects of an SSD and is not meant to represent the entirety of an SSD or limit the embodiments in anyway.

SSD 100 stores data from a host (not shown) for extended periods of time in the non-volatile memory 115. The host is able to access the SSD 100 by sending commands over the host interface 105. Although, in some instance, the host may simply alert the SSD 100 using the host interface 105 that commands are present on the host for SSD 100 to retrieve using the host interface 105.

A person of ordinary skill in the art would understand that there are multiple techniques to facilitate host-SSD communications, such as those in accordance with the NVMe standard, and further understand that the connection between the SSD and host can take a number of different formats, such as a hardwire connection or RDMA. A person of ordinary skill in the art would also understand that any technique of host-SSD communication and data storage can be implemented without departing from the spirit of the invention.

In order to effectively facilitate host-SSD communication and to manage the internal operations of the SSD 100, SSD 100 requires SSD controller 125 or a similar device to act as the brains of SSD 100. For example, SSD controller 125 manages the internal operations of the SSD 100, such as processing host commands received over host interface 105, storing data in non-volatile memory 115 and temporarily storing data that needs to be accessed quickly in volatile memory 110. SSD controller 125 is also responsible for certain maintenance operations such as garbage collection.

One of the key roles carried out by SSD controller 125 is storing, maintaining, and retrieving data from the non-volatile memory 115. Non-volatile memory 115 can be NAND flash memory. However, a person of ordinary skill in the art would understand that other types of solid state memory can be employed without departing from the spirit of the invention.

Non-volatile memory 115 is not a single uniform piece of memory. Rather, non-volatile memory 115 includes a large amount of memory dies such as memory dies 120a, 120b, 120c through 120n, where n is an integer. The larger the amount of desired data storage space of the non-volatile memory 115, the more memory dies 120 are needed, and thus the higher "n" may be. Further, in some embodiments, each memory die 120a, 120b, 120c through 120n may also include more than one plane of storage where different information may be stored on each plane. In recent years, there has been a trend of ever increasing sizes of non-volatile memory 115 within SSDs and corresponding increasing in the amount of memory dies 120.

Each non-volatile memory die 120 can store one or more blocks of data, a block being a logical unit of data. Further, each block stored in non-volatile memory 115 has a physical address so that SSD controller 125 can address the location of the block when storing data in a particular non-volatile memory die 120 and later retrieve that data. However, in order to maintain a certain degree of abstraction and ease of operation, among other reasons, the use of physical addresses is often limited to the internal operation of SSD 100. In many cases, the host interacting with SSD 100 is unaware of the physical location of the data stored in non-volatile memory 115, and more specifically on the non-volatile memory dies 120. Instead, the host will SSD 100 using logical addresses for the data stored in non-volatile memory 115. Logical addresses are often generated by the host while a program is running. The logical address is a virtual address because it does not exist physically, and therefore, it is also be called a virtual address. The logical address is used as a reference to access the physical memory location, such as non-volatile memory 115.

In order properly to ensure that a host can interact with non-volatile memory 115, the SSD controller 125 has to be able to translate a logical address to a physical address. A person of ordinary skill in the art would understand that a number of techniques exist for maintaining a logical to physical address mapping scheme. For example, certain prior art approaches store tables that have individual entries for each logical address that store the corresponding physical addresses. However, such techniques require can require a significant amount of data storage capacity just to maintain the mapping tables. In cases of large capacity SSDs, such approaches may require more data than is present in on-board volatile memory 110. This is especially true where the on board volatile memory 110 of SSD 100 is static random access memory (SRAM).

SRAM is much faster than alternatives such as dynamic random access memory (DRAM) but due to design and cost is often limited in its storage capacity. Many traditional SSDs use some internal SRAM for certain operations, but also rely on external DRAM to store mapping information, such as mapping tables, in larger capacity SSDs. Reliance on DRAM introduces a number of drawbacks. First, DRAM is slower, thereby increasing the latency of SSD operations. Further, larger capacity DRAM creates an additional power demand, thereby adding additional stress on SSD power loss protection capabilities and in conjunction with large mapping tables increasing the chance that an SSD will not properly harden during a power loss event.

In order to address these, and other shortfalls, the embodiments described herein rely on a replacement block list 130 and superblock mapping information 135 stored in the on board volatile memory 110. Replacement block list 130 and superblock mapping information 135 allow SSD controller 125 to quickly and effectively carry out logical to physical address translation without relying on external DRAM, even in the case where SSD 100 is a large capacity SSD. The function and use of replacement block list 130 and superblock mapping information 135 will be described further herein. However, first, it is beneficial to understand how data blocks are organized and managed.

Figure 2:
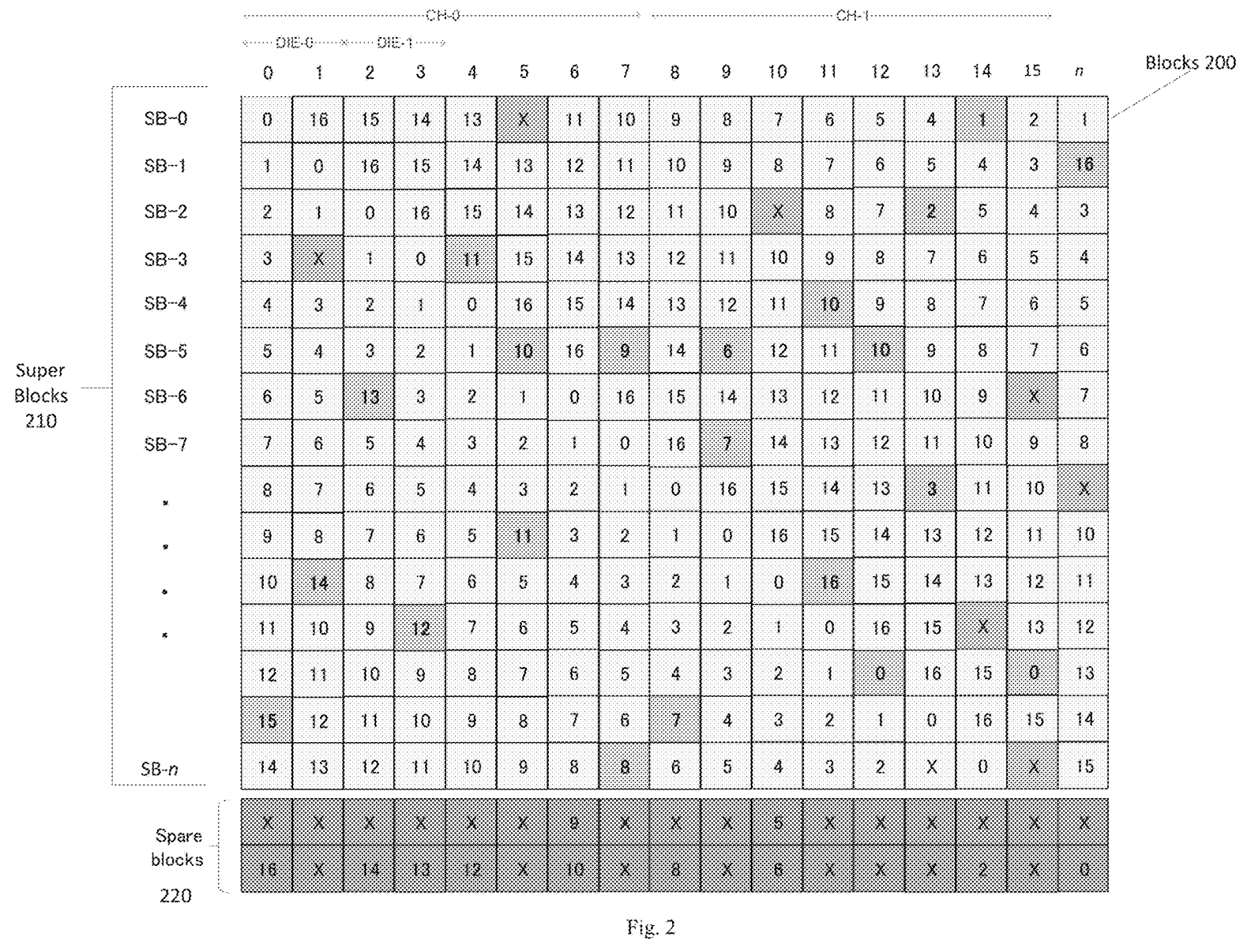

FIG. 2 illustrates a mapping of superblocks and the spare superblock according to certain embodiments described herein. Each block 200 is assigned to either a superblock 210 or into the spare superblock 220. A superblock 210 is a logical grouping of blocks that can vary in size that makes it easier to address large groups of data. The spare superblock 220 is a type of superblock that stores spare blocks that replace defective blocks within other superblocks 210. The spare superblock 220 does not have to be the same size as other superblocks and can vary in size depending on the needs of SSD, manufacturer design choice, customer requirements, or other factors. Further, there may be more than one spare superblock 220.

For example, the first block in column 0 is assigned to superblock SB-0, the second block in the same column is assigned to SB-1. A person of ordinary skill in art would understand that this is merely a simplified example and that any number of techniques can be used to assign a block to a superblock. Additionally, a person of ordinary skill in the art would understand that foregoing are merely examples and that an SSD may have many more dies and any number of channels.

Further, blocks 200 may also be physically separated as a result of being stored on different the memory dies. For example, the first two blocks of superblock SB-0 are stored on DIE-0 and the second two blocks of SB-0 are stored on DIE-2. Blocks 200 can also be separated based on what channel they are within the SSD, with a number of memory dies being attached to each channel. For example, if an SSD has two channels, the first half of the blocks 200 in a superblock 210 are on dies attached to channel CH-0 and the second half of the blocks of are on dies attached to CH-1.

In FIG. 2, blocks 200 of superblock SB-0 in columns 0-4 are good blocks and have no issues maintaining those blocks sequentially in a superblock 210. However, the SSD controller will have to determine whether a block is a good block or a defective block. The SSD controller will do so, in certain embodiments, during the initial startup. However, blocks may also become defective during operation of the SSD. The SSD controller can determine this information during operation or on subsequent startups. This allows the SSD to keep an active record of which blocks are good blocks. A person of ordinary skill in the art will understand that the time at which the SSD determines which blocks are good blocks can be done at any time without departing from the spirit of the invention. For example, the process can be done at certain time intervals, after a certain amount of read and/or write operation have been performed, or at random intervals. Further, a person of ordinary skill in the art will understand that the process does not have to be done all at once. For example, the process can be done on certain dies or channels that are not in used, done on a superblock by superblock basis, or in batches of superblocks. Frequency of the process and the method used may also be changed during operation of the SSD to suit customer or performance needs.

Not every block 200, even in a brand new SSD, is a good working block. Some blocks may be defective blocks. For example, a block may be defective due to imperfections in the manufacturing process of the memory devices. In certain embodiments of the present invention, bad blocks may be determined during testing of the SSD. Memory blocks that do not pass reliability tests (including, but not limited to, if the block fails to erase properly, if one or more pages of the block exhibit stuck bits or high error rates when read) will be marked as bad, which may be done by writing a bad block marker value into the spare area of a certain page (e.g. page 0) of the block in some implementations. In some implementations, the SSD controller may build a bad block table by scanning all blocks for bad block markers and save this table in one or more known good blocks. Upon re-booting or startup, the SSD controller may consult the table rather than repeating a bad block scan. During operation, if a block fails to erase properly or the pages exhibit stuck bits or high error rates, the bad block table may be updated. A person of ordinary skill in the art would understand that the foregoing are only examples of some methods to determine a bad block and that other methods can be implemented without departing from the spirit of the invention.

In such circumstances, the SSD controller will try to replace the defective block with a block from the spare superblock 220. This will allow the superblock 210 to maintain its capacity. For example, the block in column 14 of SB-0 is a defective block. Rather than being block 3 of SB-0, it has been replaced with block 1 of the spare superblock 220 and spare superblock 220 now holds the defective block of SB-0. Yet, in some cases, a defective block either cannot be replaced or has yet to be replace, as is the case with the block in column 5 of SB-0. These blocks are inactive and do not store data, thus not requiring any translation between logical and physical addresses.

In certain embodiments of the present invention, the bad block replacement operation occurs as part of the initial boot-up sequence of the SSD. In these embodiments, blocks that become bad or start exhibiting unreliable behavior during the operation of the SSD are not replaced using a block from the spare superblock.

Further, in certain embodiments not every initially bad block is replaced. There are number of reasons this could be the case. For example, in some embodiments, the number of initially bad blocks that need to be replaced may be high. In such circumstances, if the SSD controller tries to replace all of the bad blocks, it may need to sacrifice more superblocks to use as spare superblocks. In certain embodiments of the present invention, when a superblock is used as a spare superblock, it is "retired" and will not be used for regular data storage. In some instances, this may result in certain superblocks being retired but only a handful of their good blocks being used as spare blocks. If this occurs in, for example, an SSD that only replaces bad block on as part of the initial boot-up sequence, it may result in a large amount of good blocks going unused, thereby degrading the storage capacity and performance of the SSD while not providing a significant benefit.

In certain embodiments where not all of the initially bad blocks are replaced, the SSD controller may balance the number of bad blocks that are not replaced in each superblock in order to balance the performance of the superblocks. Alternatively, some superblocks may be prioritized and have all of their bad blocks replaced. In certain embodiments, this could occur if some superblocks are out performing other superblocks in initial testing so as to provide the maximum number of good blocks to the better performing superblocks.

However, a person of ordinary skill in the art would understand that the aforementioned scenarios involve tradeoff decisions that are often determined by the manufacturer or customer and any number of tradeoffs, or variations thereof, can be made without departing from the spirit of the invention.

The physical address of the initially good blocks of a superblock 210 can be determined using a fixed formula. The fixed formula can be based on channel, die, and other information from the logical address of a block.

In certain embodiments, each superblock has fixed number of physical blocks. In certain embodiments of the present invention, the unique index is based on the channel, die, plane of NAND, we can calculate a SLOT as follows: SLOT=[CH_NUM×(DIE_MAX×PL_MAX)]+[DIE_NUM×PL_MAX]+[PL_NUM]

If there are 8 channels, 8 die per channel and 2 NAND plane, the max SLOT would be from 0 to 127. Using the above formula, a physical block on a particular channel, die, plane can be indexed per superblock.

The max number of superblocks would be same as max number of NAND physical blocks per plane (MAX_BLOCKS_PER_PLANE). If there are 2000 physical blocks per plane as per the NAND specification, the SSD controller can create max 2000 Superblocks assuming it picks one physical block per plane for a particular superblock.

In such circumstance, which are only in accordance with certain embodiments of the present invention, the fixed formula can be a variety of arrangement. The simplest being: Physical_Block (SB[X], Slot[Y])=X. In this case, superblock-0 will pick physical block number 0 from each channel, die, and plane. Superblock-10 will pick physical block number 10 from each channel, die, and plane.

However, a more practical approach is to rotate the physical blocks by an offset of max slots to distribute average strength of physical blocks. In these circumstance, the fixed formula could be Physical_Block (SB[X], Slot [Y])=MOD [(X+Y),MAX_BLOCKS_PER_PLANE].

In this case, superblocks would look like following (similar to FIG. 2), if none of the blocks are bad blocks:

SB-0=[0,1,2,3,4,5,6,7,8,9,10,11, . . . 125,126,127];

SB-1=[1,2,3,4,5,6,7,8,9,10,11,12 . . . 126,127,128];

SB-500=[500,501,502, . . . 625,626,627];

SB-1995=[1995,1996,1997,1998,1999,0,1,2,3 . . . 120,121,122];

SB-1999=[1999,0,1,2,3 . . . 124,125,126]; and so on.

The formula(s) could be preprogramed, or determined based on the initial set up of the SSDs. Determination of the formula can vary as needed to meet the requirements of the SSD, manufacturers, end-users, and/or other requirements. In certain instances, there could be more than one fixed formula. For example, if an SSD is partitioned, the different partitions may each have their own pre-fixed formula. A person of ordinary skill in the art will understand a number of different approaches can be used to determine the fixed formula(s) and still avoid the need for storing each physical address of each block as a separate entry in a mapping table. However, if a defective block of blocks 200 has been replaced with a good block from the spare superblock 220, a fixed formula will not be able to provide a logical to physical address translation.

FIGS. 3A-3C, illustrate some of the elements needed to determine if a block is a good block or a replacement block and the examples of the type information that needs to be stored in order to provide logical to physical address translation for replacement blocks.

FIG. 3A illustrates the information that needs to be maintained for each superblock in order to facilitate logical to physical address translation according to certain embodiments of the invention. For each superblock, the SSD stores a block bit map 301 and a replacement block list index 303.

As mentioned above, the majority of blocks within any particular superblock are likely to be good blocks, but this will not be the case for every block. Rather, some blocks will be defective blocks and will need to be replaced. In order to keep track of which blocks are good blocks and which have been replaced, the SSD uses block bit map 301. For each block within a superblock, the block bit map 301 maintains a corresponding indicator bit. Although a single indicator bit is described herein, a person of ordinary skill in the art would understand that more bits could be used and that alternative methods of storing block replacement information, such as a dictionary, could be implemented with the departing from the spirit of the invention.

In addition to block bit map 301, the SSD also maintains a replacement block list index 303 for each superblock. The replacement block list index 303 can be any type of data structure and keeps a value representing the beginning index for the particular superblock in the block address list of FIG. 3C, described in further detail herein. A person of ordinary skill in the art would understand that there a number techniques that can be used to store the index information and that any number of formats may be suitable without departing from the spirit of the invention.

FIG. 3B shows a representation of the block bit map 301. Block bit map 301 has an indication bit for each block within a superblock. In FIG. 3B, bits labeled 305 represent good blocks. In certain embodiments described herein, any bit marked 305 is set to 0. Conversely, bits 306 represent indication bits of replaced blocks. In certain embodiments described herein, bits 306 are set to 1. In the example of FIG. 3B, $306_1$ represents a bit indicating that the corresponding block is the first block within the respective superblock that has successfully been replaced. Similarly, $306_2$ represents that the corresponding block is the second replaced block within the respective superblock. Block bit map 301 allows the SSD to easily maintain and look up information regarding whether a block has been replaced. The position of a defective block indicator bit 306 within the block bit map 301, with respect to other replaced defective block indicator bits 306 will, as discussed in further detail herein, help determine the physical address of the replacement block.

Since the physical address of replacement blocks cannot be determined using a fixed formula, unlike good blocks, the physical addresses of replacement blocks needs to be stored in its entirety. One possibility is to store the physical addresses of the replacement blocks in a block address list as illustrated in FIG. 3C.

Each entry in the block address list represents a physical address of a replacement block. In accordance with certain embodiments described herein, the block address list may be single list. However, a person of ordinary skill in the art would understand that other methods, such a plurality of lists corresponding to each superblock can be employed with departing from the spirit of the invention.

In the case of FIG. 3C, there is a single block address list for the entire SSD. Entries 311-316 each store the physical address of a replacement block associated with one of the superblocks of the SSD. As there is a single block address list for all of the replacement block address entries 311-316, there needs to be a method for keeping track of which entries correspond to which superblocks. In one approach, the replacement block list index 303 data associated with each superblock stores the index corresponding to the index of the first replacement block of the superblock in the block address list. As defective blocks are replaced and new entries are added to the replacement block list index 303, the replacement block list indexes 303 are updated to reflect the new index of the entry corresponding to the physical address of the first replacement for the first defective block in the superblock.

In some instances, a superblock may have more than one replacement block stored in the block address list. In some circumstances, the respective position of the defective block in the block bit map 301 is used to determine an offset that is added to the replacement block list index 303 to determine the actual index of the entry in the block address list storing the physical address of the replacement block. For example, if the replacement block index for a superblock, which corresponds to the bit map of FIG. 3B, corresponds to the index of entry 311 and the SSD needs to determine the physical address of the block associated with indication bit $306_2$, the SSD will use the replacement block list index 303 and add 1 as the offset because $306_2$ corresponds to the second replaced block of the superblock. In this example, the physical address of the block corresponding to indication bit $306_2$ is stored in entry 312 of the block address list.

As the block bit map of FIG. 3B only has four replaced defective blocks, entry 315 of the block address list of FIG. 3C represents the first entry of the replacement block(s) of a different superblock. That superblock has a different replacement block list index 303, which corresponds to entry 315 of block address list.

Figure 4:
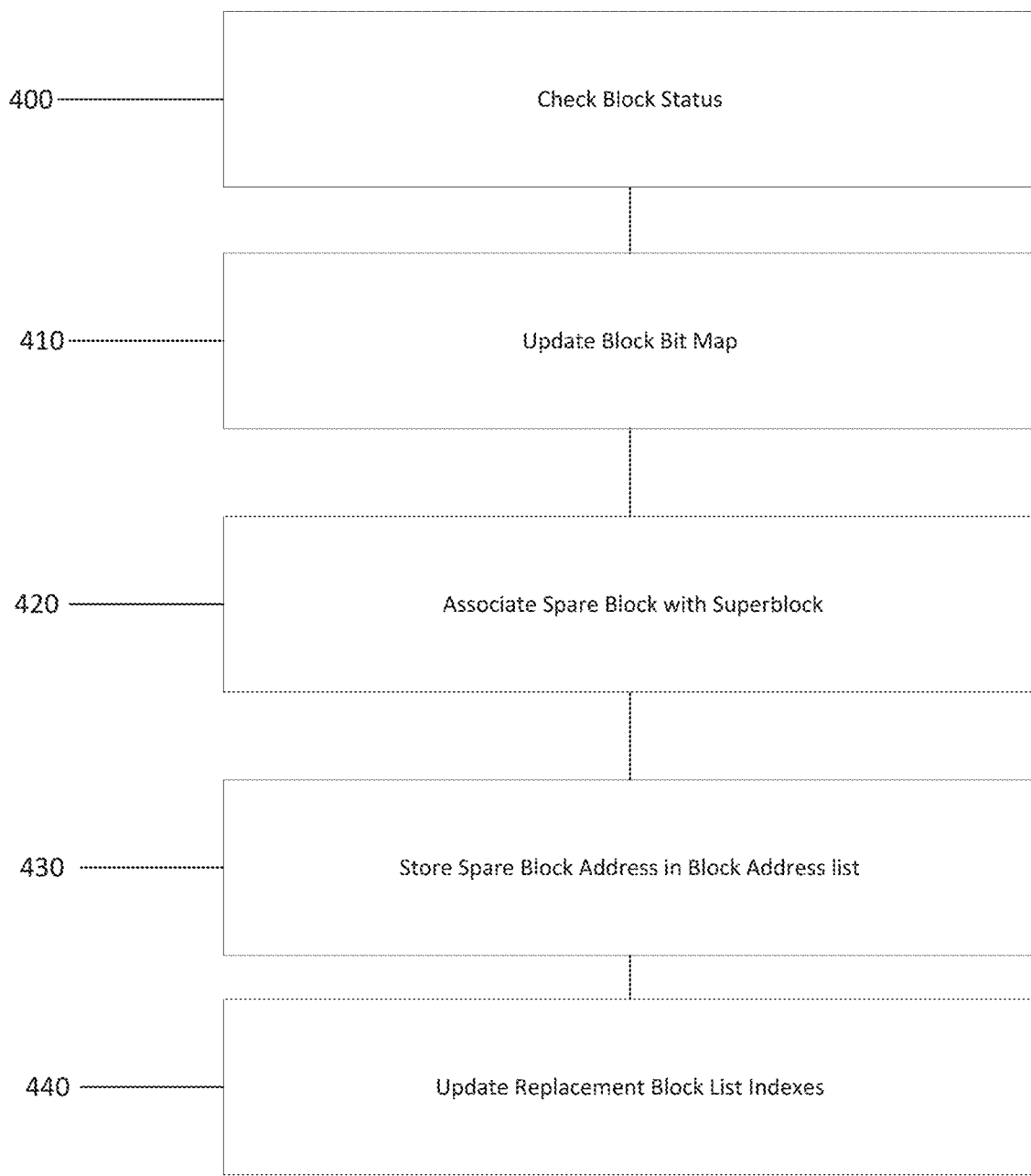
FIG. 4 is a flow chart of maintaining logical to physical mapping information in accordance with certain embodiments described herein.

FIG. 4 shows a method of maintaining logical to physical mapping information in accordance with certain embodiments described herein. In a number of embodiments, this process is carried out by the SSD controller. For example, firmware on a controller may be responsible for the operation of the process. However, a person of ordinary skill in the art would understand that there are a number of other approaches for carrying out the process described in FIG. 4 without departing from the spirit of the invention.

The process begins at Step 400 by checking the status of a block within a superblock. The check may be a standalone process for an individual block, or part of larger status verification, recovery, or other process where the status of any number of blocks is checked. The status check determines if a block is a good block, in which case no further action is required, or if the block is a defective block that requires replacement.

In case of a defective block that is replaced, at Step 410, the block bit map is updated to reflect that a block has been replaced. For example, an indicator bit may be changed from "0" to "1" to indicate that the corresponding block has been replaced and its physical address cannot be determined using a fixed algorithm as the physical address will not be related to the superblock in any predictable manner.

At Step 420, a block from the spare superblock list is associated with the superblock. The spare block will be considered part of the superblock. The defective block will be disassociated from the superblock such that superblock and system as whole do not rely on it for data storage or other operations. A person of ordinary skill in the art will understand that a number of approaches, such as those compatible with the NVMe standard, may be used maintain an association between block and their respective superblock.

In order to allow for logical to physical address translation without a known relationship between the physical address of a block and the superblock, the process, at Step 430, adds an entry to the block address list. The entry contains the physical address of the recently associated spare block. In certain embodiments, the index of the entry can be determined using the replacement block list index of the associated superblock and an offset corresponding to the position of the replacement block within the superblock relative to other replaced blocks within the superblock.

Further, as a new entry in the block address list may shift the index values of other entries and may change the index of the entry corresponding to the first entry for a different superblock. To prevent issues result from the possible index change, at Step 440, the replacement block list index of other superblocks is updated as needed. Step 440, may not occur where replacement of bad blocks happens only during the initial boot-up process. In certain embodiments of the present invention that only perform bad block replacement on the initial boot-up, the replacement block addresses are added to the replacement block address list in turn, and each superblock is processed in turn. Accordingly, in those embodiments there is no need to update the replacement block index of a superblock, rather it is set once as part of the initial boot process and does not change during operation of the SSD.

A person of ordinary skill in the art will appreciate that certain steps within the process of FIG. 4 can be carried out in a different order than illustrated without departing from the spirit of the invention. For example, the address of the replacement block may be stored in the block address list before the block bit map is updated and so on.

Figure 5:
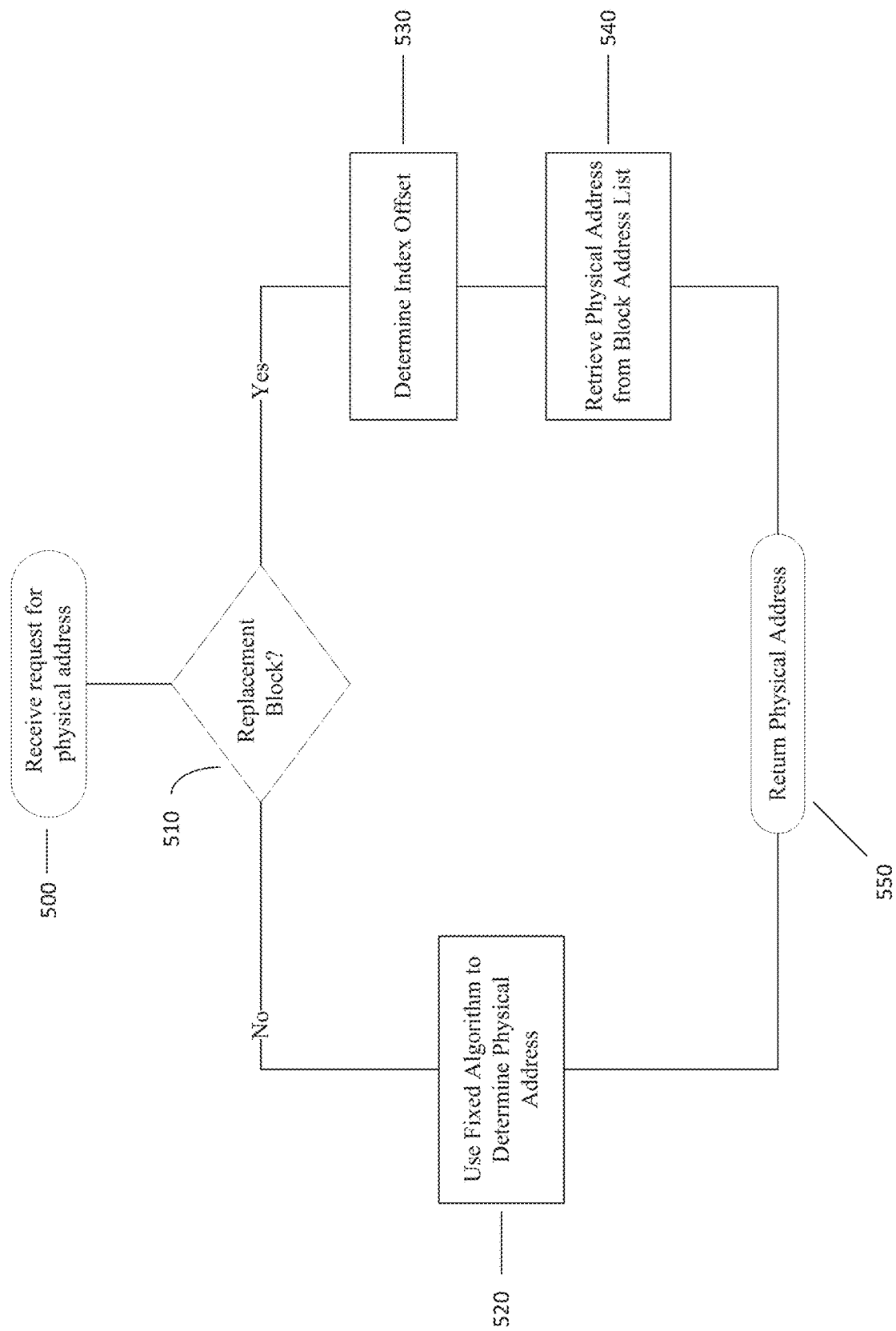
FIG. 5 is a flow chart of a method of obtaining a physical block address according to certain embodiments described herein.

FIG. 5 is a flow chart representing a method for translating a logic address to a physical address in accordance with certain embodiments described herein.

The process begins at Step 500, when the SSD receives or generates a request for a physical address, which could be as part of retrieving/storing data for a host or during management operations, such as garbage collection. Following this, the appropriate superblock will be determined based on the logical address associated with the request for a physical address.

At Step 510, the SSD will use the block bit map of the corresponding superblock to determine if the request corresponds to a replacement block or a good block.

If the request corresponds to a replacement block, the method proceeds to Step 530.

At Step 530, the index offset is determined. In at least some embodiments described herein, the index offset is determined by determining how many bits in the block bit map, prior to the requested block, indicate a replacement block. For example, if the requested block is the fifth replacement block, the index offset is 4 because there are four prior replacement blocks associated with the superblock.

Next, the index offset is added to replacement block index of the corresponding superblock.

Then, at Step 540, the physical address of the block is retrieved by retrieving the information stored in the block address list at the index corresponding to the replace block list index of the superblock plus the offset determined in step 530.

After the physical address is retrieved, the physical address is returned to whatever process requested it in Step 550.

However, if at Step 510, it is determined that the block whose physical address is requested is a good block, no further mapping information is retrieved. Rather, at Step 520, a fixed formula will be used to determine the physical address. The formula can depend on certain available information such as the block's logical address, the block's superblock, the die where the block is stored, the plane of a die that stores the block, the block's assigned channel, other information that is part of the request for physical address or an associated command, and or other information regarding the physical storage location of the block. However, the foregoing are merely examples and a person of ordinary skill in the art will understand that a manufacturer can determine different formulas to suit its needs.

Turning to FIG. 6, FIG. 6 illustrates a table comparing the amount of memory required to store mapping information for various sized SSDs according to traditional methods, which in this example are full mapping tables with unique address entries for each block, and according to methods according to certain embodiments described herein. The table shows data on three sizes of SSDs, 1 terabyte (TB), 16 TB, and 32 TB. However, a person of ordinary skill in the art would understand that the benefits certain embodiments described herein are not limited to the sizes of SSDs displayed. Further, for the purposes of the table it is assume that four percent (4%) of the blocks are initially defective blocks. However, as touched on herein, a person of ordinary skill in the art would understand that the benefits of the certain embodiments described herein apply even when a different, even higher, percentage of blocks are defective blocks.

When it is assumed that an SSD contains four percent initial defective blocks, then a superblock consisting of 128 physical blocks will have 6 defective blocks. In such circumstances, in a 1 TB SSD, containing 1,000 superblocks, the data needed to store the superblock mapping information, in accordance with certain embodiments described herein, would be 18 kilobytes (KB). For each superblock, 16 bytes (B) is needed to store the block bit map, and 2 B to store the replacement block list index corresponding to the superblock.

In the same 1 TB SSD another 12 KB would be needed to store the addresses of the defective blocks. Each block needs a 2 B address and thus each superblock requires 12 B for the addresses of the 6 defective blocks. With a thousand superblocks in a 1 TB SSD this amounts to 12 KB.

In total, for a 1 TB SSD, in accordance with certain embodiments described herein, only 30 KB is required to store the mapping information. Conversely, according to prior art approaches where every block, defective or good, has its own address stored as part of the mapping information, the same SSD would require 0.25 Megabytes (MB) to store the mapping information. That is, a 1 TB SSD operating according to certain embodiments described herein takes eighty-eight percent (88%) less data to store mapping information than an SSD operating according to the prior art. Further, these advantages do not significantly diminish if there are more defective blocks.

For example, if the number of initial defective blocks is doubled, it would take only 42 KB to store the mapping information according to certain embodiments described herein. In such a case, each superblock entry would remain the same size and only the block address list would double in size. In such circumstance, this still achieves an eighty-three and a half percent (83.5%) reduction in the data needed to store mapping information as compared to traditional SSDs.

For 1 TB SSD, these benefits may not impact where the mapping data can be stored. However, in larger SSDs the reduction allows data to be kept in SRAM, rather than being moved to slower, and higher power consuming external DRAM.

For example, according to certain embodiments described herein, it would take only 480 KB to store all of the mapping information of a 16 TB SSD and 960 KB to store the mapping information of a 32 TB SSD. Comparatively, traditionally stored mapping information would require 4 MB for 16 TB SSD and 8 MB for a 32 TB SSD. These SSD require external storage of mapping information, which, as discussed above, can lead to a number of issues such as increased latency and increasing the chance that an SSD will not properly harden during a power loss event.

As higher and higher capacity SSD continue to become the norm, these advantage will prove invaluable.

Other objects, advantages and embodiments of the various aspects the certain embodiments described herein will be apparent to those who are skilled in the field of the invention and are within the scope of the description and the accompanying Figures. For example, but without limitation, structural or functional elements might be rearranged consistent with the certain embodiments described herein. Similarly, principles according to the certain embodiments described herein could be applied to other examples, which, even if not specifically described here in detail, would nevertheless be within the scope of certain embodiments described herein.

Further, a person of ordinary skill in the art would understand that certain aspects of this invention, such as the various controllers, may be implemented as hardware, software, firmware or a combination thereof. The descriptions of such elements in certain embodiments described herein are not intended to limit the implementation of these types of elements to a singular implementation. A person of ordinary skill in the art would appreciated that there are number ways to implement certain elements of certain embodiments described herein without departing from the spirit of the invention itself.

Additionally, elements reference throughout certain embodiments described herein can be divided into certain sub-elements, combined, or duplicated without departing from the spirit of the invention.

What is claimed:

1. A solid state drive (SSD) comprising:
   a plurality of non-volatile memory dies, each configured to store at least one block of data associated with one of a plurality of superblocks each containing a plurality of blocks;
   a volatile memory; and
   a memory controller configured to:
      store a bit map associated with a first superblock of the plurality of superblocks in the volatile memory, wherein the bit map is configured to indicate whether each of the plurality of blocks is a replacement block,
      store a block address list in the volatile memory, the block address list is configured to store an address of one or more replacement blocks, and
      store a replacement block index in the volatile memory associated with the first superblock of the plurality of superblocks, the replacement block index corresponding to a location of an address of a first replacement block of the first superblock in the block address list.

2. The SSD of claim 1, wherein the memory controller is further configured to:
   determine if a block of the plurality of blocks in the first superblock is a defective block.

3. The SSD of claim 2, wherein the memory controller is further configured, upon determining that the block is a defective block, to:
   set a bit of the bit map to indicate the block is a replacement block.

4. The SSD of claim 3, wherein the controller is further configured to, at a first predetermined time period:
   associate a block of a spare superblock with the first superblock; and
   store an address of the block of the spare superblock in the block address list.

5. The SSD of claim 4, wherein the first predetermined time period is part of an initial boot-up sequence of the SSD.

6. The SSD of claim 1, for a given replacement block, the memory controller is further configured to:
   determine, using the bit map, a replacement block index offset for the given replacement block; and
   determine a physical address of the given replacement block using the index offset, the replacement block index, and the block address list.

7. The SSD of claim 1, for a non-defective block of the first superblock, the controller is further configured to:
   determine a physical address of the non-defective block using a fixed address algorithm based on a logical address of the non-defective block.

8. The SSD of claim 7, wherein the fixed algorithm is based on plane and die information derived from the logical address of the non-defective block.

9. The SSD of claim 8, wherein the plurality of non-volatile memory dies are organized into a plurality of channels and the fixed algorithm is further based on a channel of the non-defective block.

10. The SSD of claim 1, wherein the volatile memory is static random access memory.

11. A method of maintaining mapping information in a solid state drive (SSD), the method comprising:
 assigning a plurality of blocks to either one of a plurality of superblocks or a spare superblock;
 storing a bit map associated with the one superblock in a volatile memory of the SSD, wherein the bit map indicates whether each of the plurality of blocks in the one superblock is a replacement block;
 storing a block address list in the volatile memory of the SSD, the block address list storing an address of one or more replacement blocks;
 storing a replacement block index associated with the one superblock in the volatile memory of the SSD, the replacement block index indicating a location of an address of a first replacement block of the one superblock in the block address list.

12. The method of claim 11, the method further comprising:
 determining if a block of a plurality of blocks in the one superblock is a defective block.

13. The method of claim 12, the method further comprising, upon determining that the block is a defective block:
 setting a bit of the bit map to indicate the block is a replacement block.

14. The method of claim 13, the method further comprising, at a first predetermined time period:
 associating a block of the spare superblock with the one superblock; and
 storing an address of the one block of the spare superblock list in the block address list.

15. The method of claim 14, wherein the first predetermined time period is part of an initial boot-up sequence of the SSD.

16. The method of claim 11, method further comprising, for a given replacement block:
 determining, using the bit map, a replacement block index offset for the given replacement block; and
 determining a physical address of the given replacement block using the replacement block index offset, the replacement block index, and the replacement block list.

17. The method of claim 11, method further comprising, for a non-defective block:
 determining a physical address of the non-defective block using a fixed address algorithm based on a logical address of the non-defective block.

18. The method of claim 17, wherein the fixed algorithm is based on plane and die information derived from the logical address of the non-defective block.

19. The method of claim 18, the method further comprising:
 assigning each of the plurality of blocks to one or more channels, wherein the fixed algorithm is further based on a channel of the non-defective block.

20. The method of claim 11, wherein the volatile memory is static random access memory.

* * * * *